United States Patent [19]

Domenech

[11] 4,312,323
[45] Jan. 26, 1982

[54] SOLAR SWIMMING-POOL WATER HEATER

[76] Inventor: Michel Domenech, Apremont (Savoie), France

[21] Appl. No.: 96,496

[22] Filed: Nov. 21, 1979

[30] Foreign Application Priority Data

Nov. 23, 1978 [FR] France .............................. 78 33639

[51] Int. Cl.³ .............................. F24J 3/02; F28D 7/06
[52] U.S. Cl. .................................. 126/415; 126/426; 165/174; 165/176
[58] Field of Search ...................... 126/415, 416, 426; 4/172, 172.11, 172.12, 172.13, 172.14, 172.21, 172.15, 498; 165/35, 174, 175, 176

[56] References Cited

U.S. PATENT DOCUMENTS

| | | | |
|---|---|---|---|
| 152,031 | 6/1874 | Baker | 165/35 |
| 2,291,637 | 8/1942 | Kohlmann | 165/35 |
| 3,299,881 | 1/1967 | Koch | 126/416 |
| 3,802,496 | 4/1974 | Ris et al. | 165/174 |
| 3,945,059 | 3/1976 | Allocco | 126/416 |
| 3,949,095 | 4/1976 | Pelehach et al. | 126/415 |
| 3,970,069 | 7/1976 | Pickett | 126/415 |
| 3,984,882 | 10/1976 | Forman | 126/415 |
| 4,079,726 | 3/1978 | Voelker | 126/426 |
| 4,082,081 | 4/1978 | McColgan et al. | 126/415 |
| 4,103,368 | 8/1978 | Lockshaw | 126/415 |
| 4,138,993 | 2/1979 | Conley | 126/415 |
| 4,153,955 | 5/1979 | Hinterberger | 126/416 |
| 4,187,901 | 2/1980 | Coleman | 126/416 |
| 4,195,621 | 4/1980 | Firebaugh | 126/416 |
| 4,211,213 | 7/1980 | Nissen et al. | 126/416 |

FOREIGN PATENT DOCUMENTS

| | | | |
|---|---|---|---|
| 2513327 | 10/1976 | Fed. Rep. of Germany | 126/416 |
| 2349109 | 11/1978 | France | 126/415 |
| 1328372 | 8/1973 | United Kingdom | 126/416 |

*Primary Examiner*—Daniel J. O'Connor

[57] ABSTRACT

A body of water having a liquid level and an outer edge is provided with a water heater having a collector formed as an array of adjacent and substantially concentric annular flexible tubes that surround the body at the edge and that has a rectified equal to at least 30 times its horizontal cross-sectional width. The tubes have exposed upper surfaces and feed ends connected to a feed manifold and return ends connected to a return manifold. Respective feed and return conduits are connected to the feed and return manifolds and both open into the body of water below the liquid level thereof. A pump is provided in one of the conduits for drawing water from the body into the feed conduit, then passing it sequentially through the feed conduit, the feed manifold, the tubes, the return manifold, and the return conduit, and for expelling the water into the body from the return conduit. The array has a surface area equal to approximately 50% of the surface area of the body of water being heated, and the pump is relatively small so that at most a 2° C. temperature gradient is obtained between the feed and return manifolds.

9 Claims, 4 Drawing Figures

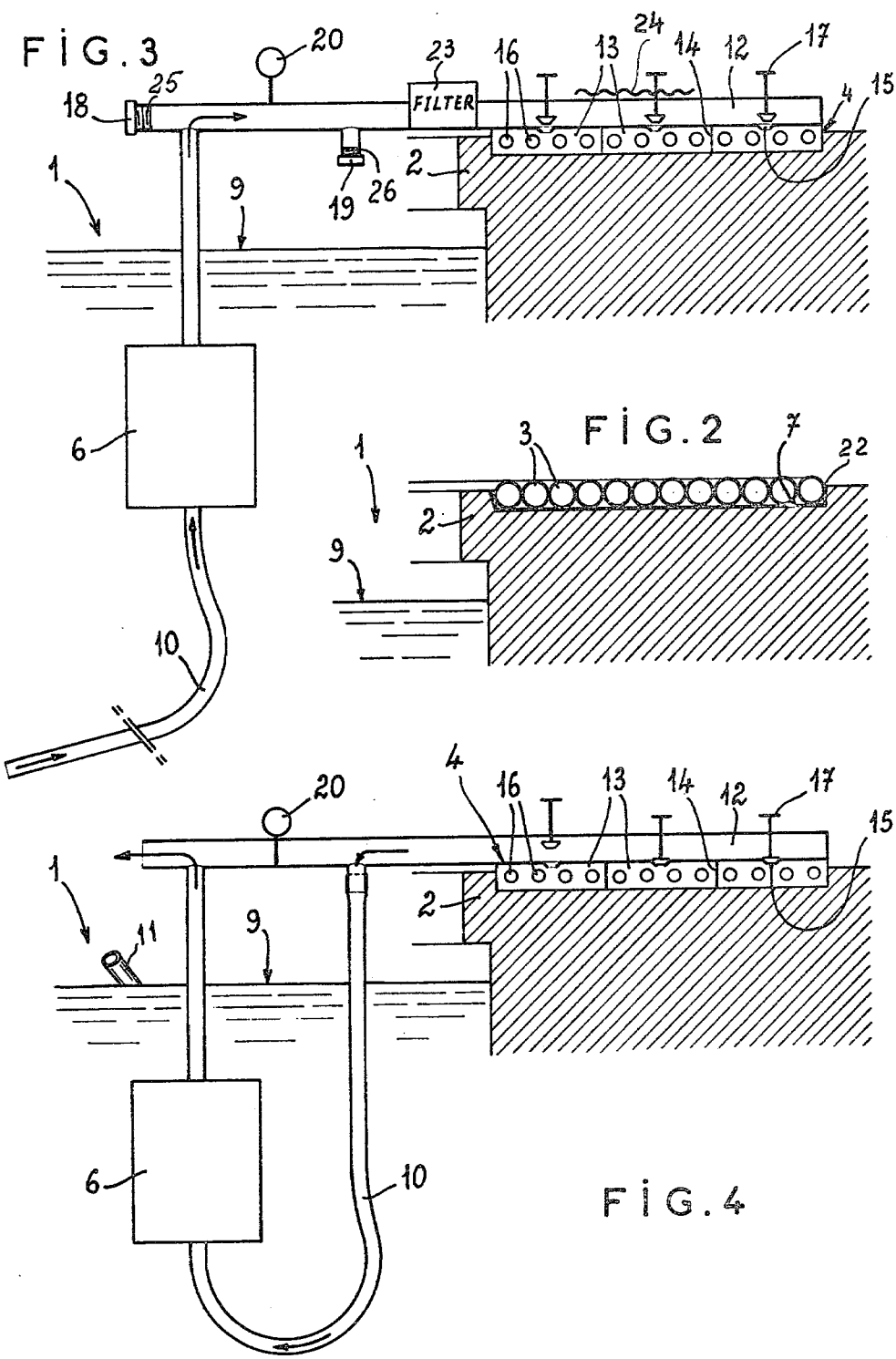

SOLAR SWIMMING-POOL WATER HEATER

FIELD OF THE INVENTION

The present invention relates to a solar water heater. More particularly this invention concerns such a water heater usable to heat a swimming pool or other body of water.

BACKGROUND OF THE INVENTION

It is frequently necessary, particularly in temperate zones, to heat the water in a swimming pool. In days of cheap energy it was not economically impractical to provide a water heater that used cheap energy to draw water out of the pool, heat it, and re-introduce it into the pool. Such an arrangement is no longer economically practical and, in some jurisdictions, is even illegal.

Therefore recourse has been had to solar-powered water heaters usable with swimming pools. These arrangements can be divided into two main types, those that operate with the so-called greenhouse effect and those that operate without it.

The arrangements using the greenhouse effect normally circulate the water through one or more conduits provided in a closed chamber insulated from the surroundings and provided with a multilayer transparent window that allows short-wave radiation to enter the chamber and heat the water circulating through it. Such an arrangement can heat the water considerably, well above ambient, so that output temperature of 50° C.–70° C. are altogether possible.

These greenhouse-effect arrangements are, however, relatively expensive. The collectors are normally relatively large and complicated control arrangements and pumps must be provided. Their use, therefore, for heating swimming pools is relatively limited, as the first costs of the installation, even assuming that they can be operated for free, are very great. What is more they are relatively bulky and frequently constitute an eyesore at the swimming pool, which is obviously intended to be an agreeable recreational location.

The devices that operate without the greenhouse effect achieve a much lower output temperature, normally in the neighborhood of 20° C.–30° C. In these arrangements the fluid is passed through a conduit which is exposed directly to the rays of the sun, and which normally is not insulated at least on its upper side. For this reason the water cannot be heated much above ambient temperature, and in fact it is widely recognized that the lower the temperature differential the more efficient such a unit is. Thus it is advantageous to maximize the collector area and volume of flow through the collector so that the temperature differential between the feed end and return end of the collector is less than 4° C.

To problem with such arrangements is, however, that the collectors once again are extremely bulky and unattractive. To effectively heat a swimming pool it is normally necessary to provide a collector surface area equal to at least half of the surface area of the pool whose water is being heated. The collectors are normally formed as panels having a length equal to approximately twice their width, so that it is necessary somewhere near the pool to erect an enormous battery of the panels to achieve the necessary heating effect. These panels have to, therefore, be connected together, normally in parallel. As a result considerable pains must be taken to ensure uniform flow through all of the collector panels of the battery. As with the greenhouse-effect heaters, it is therefore necessary to provide a large and unattractive heating installation as near the pool as possible, thereby once again making the pool surroundings relatively ugly and unsuitable for recreation purposes.

It has been suggested to provide a single extremely long tube that forms a spiral around the pool. Such an arrangement has, however, not been effective in practice as it is either necessary to provide a very large or long tube or a very large pump. Any of these solutions makes the device unworkable in other respects, so that this suggestion has never found a practical application.

OBJECTS OF THE INVENTION

It is therefore an object of the present invention to provide an improved solar water heater for heating a body of water.

Another object is to provide such a heater which can be readily adapted to any body of water of virtually any size, and which can be made relatively attractive so that it can be provided directly at the pool.

Still another object is to provide such a system which can be produced, even custom-made, at relatively low cost.

A further object is to provide a water heater which can be integrated with other standard poolside equipment.

SUMMARY OF THE INVENTION

These objects are attained according to the instant invention in a water heater using as a collector an array of adjacent and substantially concentric annular flexible tubes that surrounds the body of water at its outer edge and that has a rectified length equal to at least 30 times its horizontal cross-sectional width. The tubes have exposed upper surfaces and each only form a single turn around the body of water, but are completely integral and of one-piece construction between their feed and return ends. A feed manifold is connected to all of the feed ends and a return manifold is connected to all of the return ends. Respective feed and return conduits are connected to the feed and return manifolds and both open into the body of water below the liquid level thereof. Means is provided including a pump in one of the conduits for drawing water from the body in through the feed conduit, for passing the water sequentially through the feed manifold, tubes, return manifold, and return conduit, and for expelling the water into the body from the return conduit. According to this invention the rectified length of the array is between 30 and 50 times its horizontal cross-sectional width, so that it is possible to obtain a relatively large collector area capable of adequately heating even a relatively large pool. What is more the tubes are flexible so that they can conform to the terrain around the pool, and present no unattractive hazard whatsoever for the users of the pool. In fact the adjacent flexible tubes even form a relatively agreeable surface that can be walked on with no harm and that has been found to constitute a desirable surface for sunbathing.

It is possible as mentioned above to obtain a relatively large collector surface area formed by the upper surfaces of the tubes. This area can be equal easily to about 50% of the surface of the body of water to be heated, and normally has a rectified length equal to about 40 times its horizontal cross-sectional width. Thus for example for a rectangular pool having a surface area of 12 m by 6 m, so that it has a surface of 72 m², the central line of the generally rectangular array defines a rectangle approximately 13 m by 7 m. The array has a horizontal cross-sectional width of 1 m, so that the array has a surface area of approximately 40 m². The array can have 52 standard tubes of oval section measuring approximately 15 mm by 19 mm having an average length of 40 m. Using a relatively small pump that only consumes between 200 watts and 300 watts it is possible to adequately heat a large swimming pool while only using a modest degree of nonsolar energy. What is more the tubes can be made of a relatively inexpensive synthetic-resin resistant to ultra-violet radiation and of the type used for irrigation, so that the cost of the arrangement can be relatively low.

According to another feature of this invention the array of tubes is recessed in the ground with the upper surfaces of the tubes substantially level with the ground. A thermally insulating mat or layer is provided underneath the tubes to prevent an undesired heat exchange with the normally relatively cool ground. It has been found that forming this array as a band surrounding the pool is often esthetically very pleasing and adds, rather than detracts, from the appearance of the site.

According to further features of this invention one of the manifolds is subdivided into a plurality of compartments each connected to a respective group of tube ends. These compartments are all connected via respective valves to the respective conduit so that flow can be varied from one compartment to another to ensure equal flow through all of the tubes. The inner tubes are somewhat shorter than the outer tubes so that the resistance to flow through them is normally somewhat less, so that the inner valves are normally closed slightly during normal operation. The valves also can be all closed or opened one-by-one to completely purge the respective tubes of air, as once the entire system is completely water-filled and free of air so flow through it at the relatively low velocities employed takes place with minimal friction.

According to further features of this invention the one manifold that is subdivided into the compartments is the feed manifold and the pump is provided in the feed conduit. The feed conduit has between the pump and the feed manifold upstream and downstream closable openings that are normally closed. The feed conduit has between the upstream and downstream openings a closable purge valve. Finally the feed conduit has upstream of the pump a flexible section connected to the downstream opening when this is not blocked, normally by a plug. Thus it is possible to connect the downstream opening to the flexible portion of the feed conduit, close the purge valve, open the upstream opening, and lift the return conduit above the liquid level in the pool so that the pump can operate to drain all of the tubes. This operation can be carried out even by a relatively unskilled person at the end of the swimming season to drain the conduits so that ice does not form in them over the winter.

It is also possible to provide one of the manifolds with an auxiliary electric, gas or similar heater. Furthermore the standard swimming-pool filter and water-treatment apparatus can be incorporated into the device, normally connected between one of the conduits and the respective manifold.

Using an insulating mat between the array of tubes and the ground and a pump so small that the temperatures differential between the ends of the tubes is only at most 2° C. ensures an extremely high operational efficiency. Providing a submersible pump in the feed conduit underneath the water level prevents any accidental introduction of water into the line, as frequently occurs at a pump, and furthermore protects the pump itself against freezing.

BRIEF DESCRIPTION OF THE DRAWING

FIGS. 2 and 3 are sections taken respectively along lines II—II and III—III of FIG. 1; and FIG. 4 is a view similar to FIG. 3 showing the arrangement when it is hooked up to drain the collector tubes.

SPECIFIC DESCRIPTION

Figure 1:
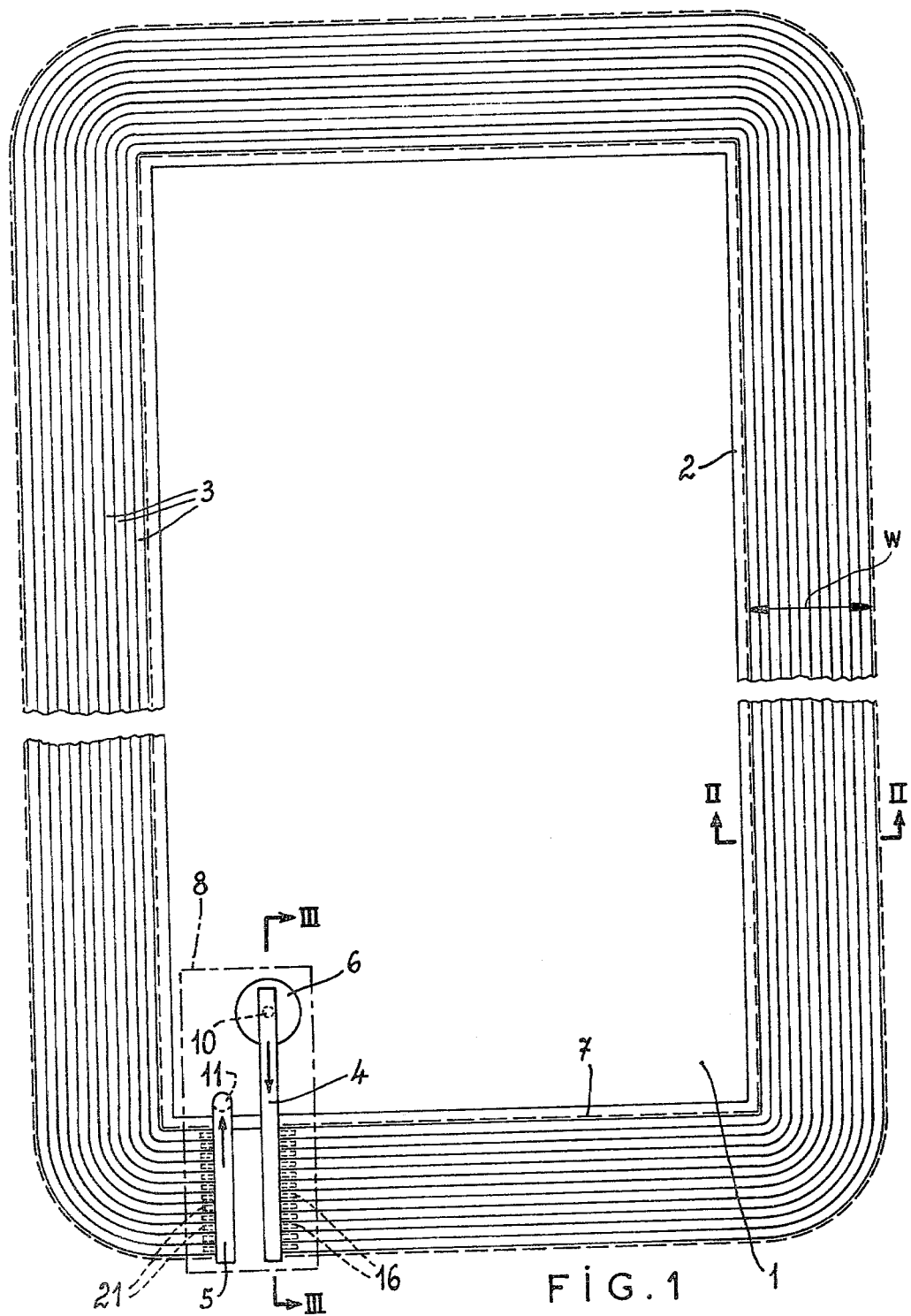
FIG. 1 is a top view of the system according to the instant invention.

The arrangement according to the instant invention is intended for use in combination with a body of water, here a pool 1 having an outer edge 2 and a liquid level 9. The collector of the inventive water heater comprises a plurality of substantially identical flexible synthetic-resin tubes 3 having feed ends fitted over connections 16 of a feed manifold 4 and return ends fitted over connections 21 of a return manifold 5. The manifolds 4 and 5 extend perpendicular to the tubes 3 and are immediately adjacent one another. The collector tubes 3 have an average overall length equal to between 30 times and 50 times the width W of the array, measured horizontally. The tubes 3 are recessed in a shallow trough 22 cut in the ground so that their upper sides, as seen in FIG. 2, lie generally at the ground level. An insulating mat 7 is provided in the trough 22 underneath the tubes 3. Normally the pool is formed with a concrete apron that is formed with the trough 22 for the tubes 3.

A small-volume submersible circulation pump 6 is provided between an upstream section 10 and a downstream section 12 of a feed conduit 10, 12 connected to the feed manifold 4. The return manifold 5 is connected as seen only in FIG. 1 to a return conduit 11 that is flexible and that hangs down below the liquid level 9. A cover 8 is normally provided above the pump 6 and manifolds 4 and 5 to protect them, and the manifold 4 can pass through a filter 23 and can also be provided with an electrical resistance heater as indicated schematically at 24 in FIG. 3.

The feed manifold 4 is subdivided by partitions 14 into three compartments 13 each opening via a respective hole 15 into the downstream section 12 of the feed conduit 10, 12. Individually operable valve bodies 17 can close these holes 15, and each compartment 13 is connected to a respective group, here four, of the tubes 3.

The upstream conduit portion 12 has a pair of openings 25 and 26 normally blocked by respective plugs 18 and 19. In addition a purge valve 20 between the openenings 25 and 26 can block the downstream feed-conduit portion 12.

Under normal circumstances the valve bodies 17 are all spaced from their respective holes 15, the plugs 18 and 19 are in place, and the valve 20 is open. The pump 6 operates therefore to suck water in through the upstream conduit portion 10 and feed it via the downstream conduit portion 12 to the compartments 13. Thence the water passes as a plurality of streams through the conduits 3, circuiting the pool 1 and rejoining at the return manifold 5 whence the water flows back into the pool 1. The considerable surface area of the tubes 3 allows considerable solar energy to be imparted as heat to the water in these conduits 3. The pump, however, operates at a relatively low rate so that a temperature differential of at most 2° C. is obtained between the manifolds 4 and 5.

In the event that air enters any of the tubes 3 it is a relatively simple procedure to close the valves 17 for the tubes 3 of all of the other groups, so that the pump 6 operates only to circulate water through one of the groups of tubes 3. The increased throughput will normally remove all of the air in any tube 3, whereas the relatively low throughput when all of the valves 17 are open is normally not adequate to do this. It is also necessary to follow this procedure at the beginning of a season when the tubes have been drained so as to fill up the various tubes 3.

At the end of the season it is similarly necessary to drain the tubes 3 completely so as to protect them from water freezing inside them. This is achieved as shown in FIG. 4 by removing the plugs 18 and 19 and closing the valve 20. Then the upstream feed-conduit section 10 is fitted over the opening 26 and the return tube 11 is lifted so that its mouth is above the level 9. All but one of the valves 17 are closed and the pump is then operated to suck all of the water out of the tubes 3 connected to the compartment 13 whose valve is open. Once all the water has been sucked out this valve is closed and another valve is opened so as sequentially to purge all of the tubes 3. This procedure is relatively simple and can be followed even by a relatively unskilled pool owner. Once the tubes 3 have all been substantially drained the system is winterized, as the pump 6 which lies below the level 9 is normally adequately protected against freezing by the large quantity of water between it and the atmosphere.

The system according to the instant invention is extremely advantageous in that it can be provided directly at a swimming pool, without taking up any valuable space. The upper surface of the tubes 3 is a relatively agreeable and safe walking and recreational surface. In fact in use it has been found to be so very agreeable that some bathers lie on it, finding the cool water flowing through the tubes relatively comfortable on hot days while enjoying the soft surface presented by these synthetic-resin tubes. The tubes may be of dark opaque plastic, or may be at least partially transparent, that is transparent to ultraviolet radiation at least. Using a relatively small 200 Watt pump 6, it is possible on a normal sunny day to impart 100,000 kilocalories to the pool water with a collector having a surface of a mere 35 m². The energy saving is, therefore, enormous.

What is claimed is:

1. In combination with a body of water having a liquid level and an outer edge, a water heater comprising:

an array of adjacent and substantially concentric annular flexible synthetic-resin tubes surrounding said body at said edge and having a rectified length equal to at least 30 times its horizontal cross-sectional width, said tubes lying horizontally and laterally against one another and having exposed upper surfaces and respective and adjacent feed and return ends;

a feed manifold connected to all of said feed ends;

a return manifold connected to all of said return ends, whereby said tubes are connected in parallel between said manifolds;

respective feed and return conduits connected to said feed and return manifolds and both opening into said body of water below said liquid level thereof; and means including a pump in one of said conduits for drawing water from said body in through said feed conduit, for passing the water sequentially through said feed manifold, tubes, return manifold, and return conduit, and for expelling the water into said body from said return conduit.

2. The water heater defined in claim 1, further comprising a thermally insulating mat immediately underneath said array of tubes.

3. The water heater defined in claim 2 wherein said tubes are recessed in the ground with their said upper surfaces substantially level with the ground.

4. The water heater defined in claim 1 wherein said pump is in feed conduit and underneath said liquid level.

5. The water heater defined in claim 1 wherein one of said manifolds is elongated and subdivided longitudinally into a plurality of longitudinally succeeding compartments each connected to a respective group of the respective tube ends and each connected to the respective conduit.

6. The water heater defined in claim 5, further comprising means including respective valves between said compartments and the respective conduit for varying flow between said groups.

7. The water heater defined in claim 6 wherein each of said valves can be fully closed to completely block flow through the respective tubes.

8. The water heater defined in claim 1, further comprising a filter connected in series with said tubes.

9. In combination with a body of water having a liquid level and an outer edge, a water heater comprising:

an array of adjacent and substantially concentric annular flexible tubes surrounding said body at said edge and having a rectified length equal to at least 30 times its cross-sectional width, said tubes having exposed upper surfaces and respective and adjacent feed and return ends;

a feed manifold connected to all of said feed ends and subdivided into a plurality of compartments each connected to a respective group of said feed ends;

means including respective valves which can be fully closed to completely block flow through the respective compartments for varying flow between said groups;

a return manifold connected to all of said return ends;

respective feed and return conduits connected to said feed and return manifolds and both opening into said body of water below said liquid level thereof;

means including a pump in said feed conduit for drawing water from said body in through said feed conduit, for passing the water sequentially through said feed manifold, tubes, return manifold, and return conduit, and for expelling the water into said body from said return conduit, said feed conduit having between said pump and said feed manifold a normally closed upstream and a normally closed downstream closable opening; and a closable purge valve in said feed conduit between said upstream and downstream openings, said feed conduit having upstream of said pump a flexible section connectable to said downstream opening when same is not closed, whereby when said downstream opening is connected to said section of said feed conduit, said purge valve is closed, said upstream opening is open, and said return conduit is lifted to open above said liquid level, said pump can drain said tubes.

* * * * *

UNITED STATES PATENT AND TRADEMARK OFFICE
CERTIFICATE OF CORRECTION

PATENT NO. : 4,312,323
DATED : January 26, 1982
INVENTOR(S) : Michel Domenech

It is certified that error appears in the above-identified patent and that said Letters Patent is hereby corrected as shown below:

ON THE TITLE PAGE INSERT,

-- (73) Assignee: Paul Le Corvoisier, Limas (Rhone), France --.

Signed and Sealed this

Seventh Day of December 1982

[SEAL]

Attest:

GERALD J. MOSSINGHOFF

*Attesting Officer*  *Commissioner of Patents and Trademarks*